Nov. 1, 1949.　　　　　R. G. BRINGOLF　　　　　2,486,387
HOSE
Filed May 30, 1944　　　　　　　　　　　　2 Sheets-Sheet 1
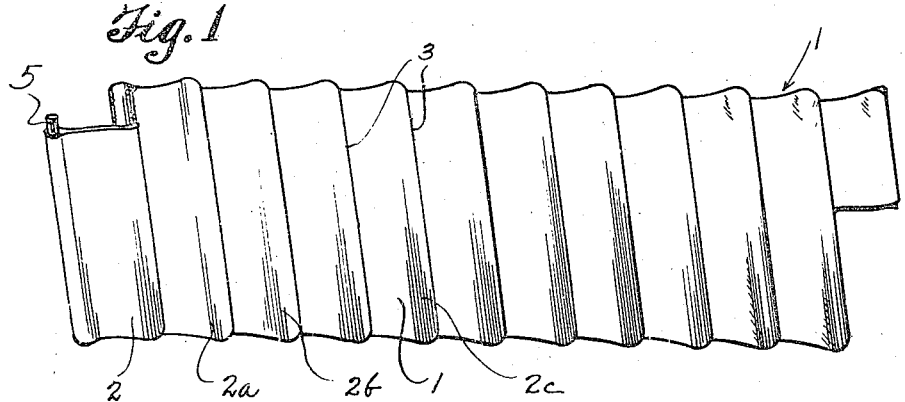
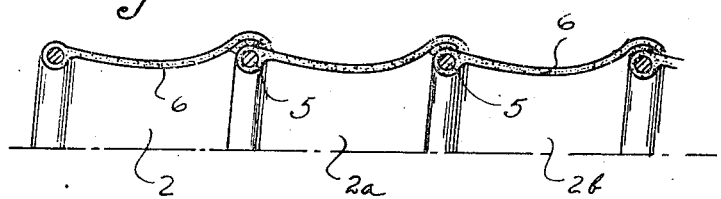 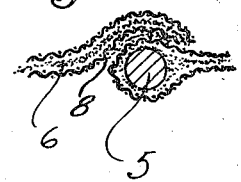
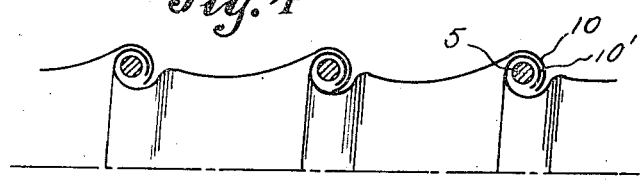 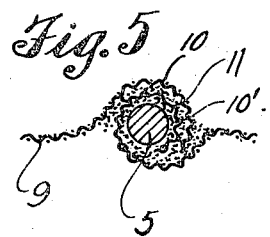
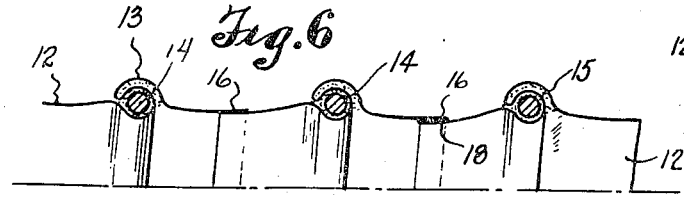 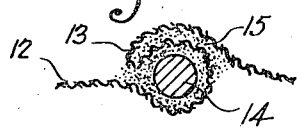
INVENTOR.
RICHARD G. BRINGOLF
BY
　　　　　　ATTORNEYS

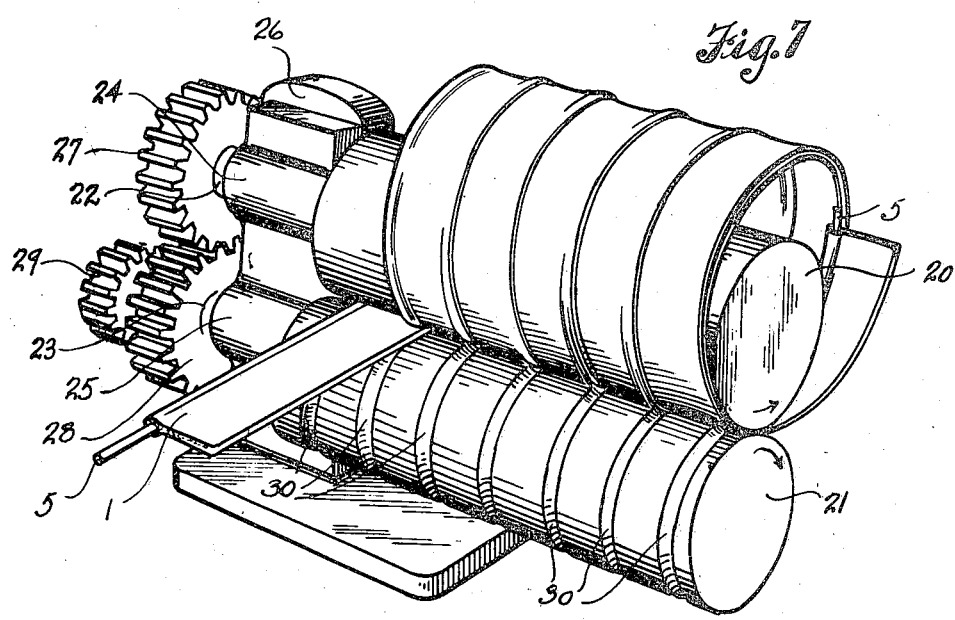
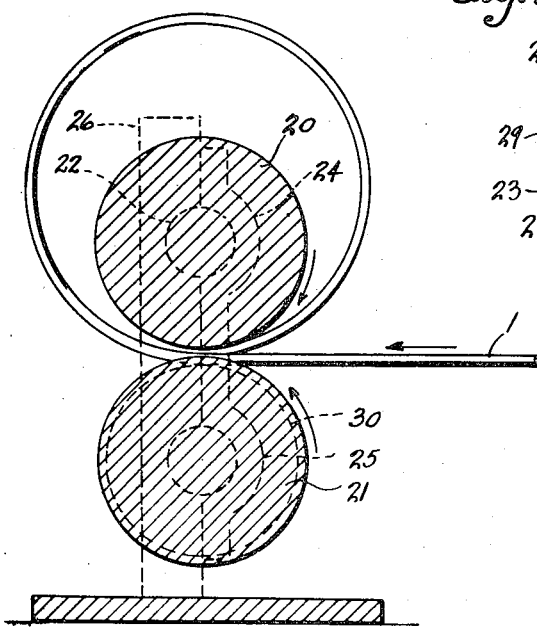
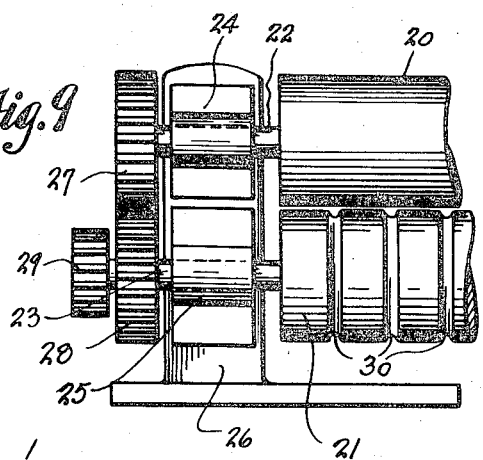

Patented Nov. 1, 1949

2,486,387

UNITED STATES PATENT OFFICE 2,486,387

HOSE

Richard G. Bringolf, Seattle, Wash., assignor to American Ventilating Hose Co., Seattle, Wash., a corporation of Washington Application May 30, 1944, Serial No. 538,047

5 Claims. (Cl. 138—56)

This invention relates to hose, and to novel methods of and novel means for its manufacture.

More particularly, the present invention concerns the manufacture of a type of flexible hose, or duct, especially useful for the conduction of ventilating air, gases and the like, although not, by reason of its structure, restricted to that specific use; such hose being characterized by its having durability, exceptional flexibility and lightness of weight particularly in its larger diameters.

The principal objects of this invention are: First, to provide a hose for the above stated and other purposes, embodying certain novel details in the construction and combination of its parts that give it additional and more uniform flexibility at all points along its length; whereby its strength is increased; whereby the durability and integrity of its seams are insured, and greater speed of manufacture of this type of hose is made possible.

Furthermore, to provide a hose of a type of construction that can be built in any of its range of diameters by the same machine.

Second, to provide a method of manufacturing hose, incorporating therein the advantages and those novel features of construction embodied by this invention, that will greatly expedite and simplify the operation and make possible the formation of a continuous duct, or hose of any desired length and of any desired diameter within practical limits.

Third, to provide a novel type of machine for the making of a hose in accordance with the novel method herein set forth and embodying its novel details of construction.

More specifically stated, the first mentioned object of the invention anticipates the formation of a continuous hose or duct of a selected diameter from a prefabricated strip of a suitable flexible material; for example, a strip of canvas or fabric of a designated width and of indeterminate length, that is formed into a succession of uniform, lapping spirals or convolutions, thus to provide the continuous duct of uniform diameter, and wherein the continuous joint or seam between overlapping edges of adjacent convolutions, is sealed and secured by a suitable cement or adhesive and the body structure of the formed tube is given strength and durability, and its tubular form insured by the incorporation therein of a spirally formed reinforcing band, or wire, that is directly associated with the fabric strip in spirals that are coincident with the successive spirals of the hose, either incorporated in the seams or in the body of the strip material.

Those objects of the invention which apply to the methods of manufacture of the hose anticipate, in the making of one type or modification thereof, the longitudinal folding of the selected fabric strip and protectively enclosing the continuous reinforcing band or wire in the fold prior to the strip being formed into the succession of spirals or convolutions. Also, the invention anticipates in another modification of the hose, the application of the reinforcing wire, or band, to the tube at the time of forming the spirals, by causing it to be fed into the continuous seam between the overlapping edges of the successive convolutions. Furthermore, that in this latter modification, a special interlocking of the overlapping edges of the spirals shall be effected to insure the strengthening and integrity of the cemented seam and the complete enclosing of the wire as a means of protecting it against damage by contact with gases or other fluids that may be conducted through the hose.

The method further contemplates feeding the prefabricated strip in a manner and under a predetermined frictional holding and pressure forming means from successive spiral formations of the strip, together with the feeding position of the strip being such that the reinforced edge of the strip of one spiral is caused to underlie the unreinforced edge of the next following spiral.

The method further contemplates the utilization of the frictional holding and guiding property of the inserted wire or band as a selective means for determining to some extent the flexibility of the completed hose through providing a prefabricated strip of selected width and providing the frictional holding and guiding detail to form the successive spirals of a width lengthwise of the hose in accordance with the selected width of the prefabricated strip and thus space the reinforced and therefore the comparatively rigid edges of the strip, any desired distance apart with consequent selected flexibility of the completed hose.

Those objects of the invention pertaining to the machine for the manufacture of the present hose by methods embodied by this invention anticipate the provision of devices of novel form and arrangement in the machine for the formation of the prefabricated strip into a succession of evenly formed convolutions of any selected diameter and for causing the edges thereof to be overlapped and pressed together to effect the intended sealing and joining of the seam.

Still further objects of the invention reside in the details of construction of the parts of the hose and in their assembled relationship; in the character of and sequence of steps involved in its manufacture and in the details of construction of parts of the machine, in their relationship and mode of operation, as will hereinafter be fully described.

In accomplishing the stated and other objects of the invention, I have provided the improved details of construction, the preferred forms of which are illustrated in the accompanying drawings, wherein—

Fig. 1 is a side view of a section of hose with details of construction embodied by the present invention.

Fig. 2 is an enlarged sectional view of a portion of the hose wall, taken lengthwise thereof and showing the disposition of the reinforcing band in the fold of the fabric strip, and the joint sealing material between the reinforced and unreinforced edges of the strip.

Fig. 3 is an enlarged cross sectional view of one of the seams of the hose.

Fig. 4 is a sectional view of a hose of an alternative, or modified form of construction.

Fig. 5 is an enlarged detail of the joint between windings of the hose.

Fig. 6 is a sectional detail of a wall portion of still another modified form of construction.

Fig. 6A is a view similar to Fig. 5 of the form of the invention shown in Fig. 6.

Fig. 7 is a perspective view of a machine suitable for making hose in accordance with the methods embodied by the present invention.

Fig. 8 is a cross sectional view of the machine.

Fig. 9 is an elevation showing the pressure roll driving gears of the machine.

Referring more in detail to the drawings—

First describing the present hose in what might be termed its present preferred form of construction, as seen in Figs. 1 and 2:

1 designates a section, or length of the present type of hose, comprising a continuous tubular body in the form of a helix made up of a continuous strip of a selected flexible material, formed into a succession of convolutions, designated at 2, 2a, 2b, 2c, etc., each convolution with its opposite longitudinal edge portions underlapped and overlapped respectively with the longitudinal edge portions of the next preceding and following convolutions and cementitiously secured thereto in a closed seam or joint 3.

In the formation of the prefabricated strip of material, as applied to the tube of Fig. 1, I preferably use a continuous strip of a selected, suitable fabric such, for example, as canvas, or the like. Such a strip would be of uniform width throughout its length and of indeterminate length, depending upon the length of tube desired, and this strip of material is preferably folded substantially along its central longitudinal line and the various convolutions 2 to 2c are applied in a manner to form areas of double thickness between contiguous edges of adjacent convolutions. However, if only a single thickness of material between adjacent convolutions is desired, obviously the fold will be nearer one edge.

Preparatory to, or at the time of thus folding the strip, a continuous reinforcing band or wire 5 of a selected material, of any selected cross sectional shape, but preferably round, is applied to the strip within the folded edge. Then the overlapped and engaged layers of the folded strip are united by an interposed layer of a suitable adhesive or cement, designated at 6 in Fig. 2. This cement also may surround the wire, as observed in Fig. 3.

The folded strip of fabric with wire reinforcing applied within the fold and the fabric layers joined by the cement is then formed into the succession of convolutions so as to cause the unreinforced edge of the folded strip to be overlapped on the reinforced edge as shown best in Fig. 2. The lapped edge portions are joined and the continuous seam is sealed by the application thereto of a suitable adhesive or cement designated at 8. This may be applied to the seam as the tube is formed or applied to the edge of the strip prior to the winding of the tube. The wire, in this particular structure, is entirely enclosed and is thereby amply protected from injury or corrosion by contact with fumes or fluids that might be conducted through the hose, and it serves not only to give the tube a required strength and maintain its tubular form, but it also adds to the strength and durability of the seam and is a factor in the formation of the convolutions by the machine presently to be described.

In the winding of the tube, the fabric strip is rather tightly drawn, and thus, in the final form of the hose, the walls are somewhat inwardly troughed between the helical line of the reinforcing, as is illustrated in Fig. 2. This inward, troughed formation of the wall insures the inward bending of the wall material between the lines of reinforcing at that side of the hose toward which the hose might be bent or curved and thus provides a greater degree of flexibility than is otherwise obtainable.

The spacing of the convolutions of the reinforcing wire, which is more or less based upon the width of the strip used in making the hose, determines to some extent the flexibility of the tube.

In Fig. 4 of the drawing, I have shown an alternative form of hose structure made from a fabric strip of single thickness. It is anticipated, in the making of this modification, that the reinforcing wire and strip shall be simultaneously wound into the tube and that in the winding process, devices will be employed to fold the edges of the strip into an interlocked seam wherein each engaged edge has a back-turned edge portion or flange enclosed within the fold that is formed along the other.

In Fig. 5, 9 designates the continuous strip of fabric from which the hose is made, and 10 and 10' designate the back-turned, inter-folded edges of adjacent spirals of the strip. Note is to be taken that a cementitious joint sealing material 11 is applied between the back-folded edges of the strip and also about the wire to seal and secure the seam. The wire is here disposed within the fold of the inside layer of the strip and is encased in a double thickness of material and also by the joint sealing cement which encloses it.

In that modification of hose structure illustrated in Fig. 6, a continuous strip of selected material 12 is employed. This is of single thickness but is formed between its longitudinal edges with a reverse fold 13 forming a triple thickness of material. A reinforcing wire 14 is enclosed within the fold and the fold is secured by cement layers 15 between the layers of material. In making the tube, the strip is helically wound and the edges of adjacent convolutions are overlapped to form a continuous seam 16 as shown and these edges are secured by an intermediate layer of cement, as at 18.

Such ducts or hose can be made in any selected diameter, within practical limits and of any desired length, and still other modifications might be made in the character of the seam and manner of enclosing the wire.

The continuous strip used in making the hose embodied by the disclosures in Fig. 6 may be prefabricated, and then helically wound as is the strip used in making up the hose of Fig. 1.

The methods embodied in this invention therefore contemplate, on the one hand, the prefabrication of a continuous strip of material of a length required for the making of a hose of a desired length and diameter, and the formation of this strip into convolutions of a designated diameter while at the same time causing the edge portions of the successively formed convolutions to be overlapped and secured by a suitable cement applied to the strip before or during the winding operation. On the other hand, the invention contemplates the provision of a hose of a designated length and diameter from a continuous strip of selected fabric or the like, which is caused to be formed into a succession of convolutions with edges brought into overlapped relationship while a continuous reinforcing band or wire is fed into the seam and the seam sealed or joined by an applied cementitious material followed immediately by an application of pressure, to insure the integrity of the joint.

In Figs. 7, 8 and 9, I have illustrated a machine suitable for the making of hose in accordance with the methods disclosed herein. In its preferred form of construction, the machine comprises two cylindrical rollers 20 and 21 that are coextensive and mounted with axes parallel. The spacing between the peripheries of rollers 20 and 21 is indicated in Fig. 8 and will depend upon the thickness of the material employed and if desired may be adjustable for materials of different thicknesses. At corresponding ends, these rolls have mounting axles 22 and 23 rotatable in bearings 24 and 25 carried by a frame 26. Fixed on the axles respectively are intermeshing gears 27 and 28 of like diameter, causing the rolls to rotate at the same speed and in opposite directions. On one axle is a driving gear 29.

The roller 21 is formed with a succession of equally spaced, encircling channels 30 normal to the axis of the roll and each shaped and sized to more or less snugly receive the wire and its fabric wrapping when a prefabricated strip is fed into the machine between the rollers. The spacing of the channels along the roll is less than the width of the prefabricated strip and determines the spacing of the successive windings as will presently be understood.

With the prefabricated strip and the described or an equivalent friction holding and pressure forming means provided, the method of manufacture is as follows:

The prefabricated strip as illustrated in Fig. 7 is fed between the rollers 20 and 21 from one side and the fabric strip enters between the meeting margins of the rolls with the reinforcing wire at the fold of the strip resting in the leading channel of the roll, and the remaining width of the strip extending to and overlying the next adjacent channel. The rollers are driven initially by hand and the inserted strip is fed to and beyond the rolls, equivalent to the circumference of the desired hose, and then returned over the upper roll and the reinforced end of the strip; that is, the fabric wrapped wire portion, is fed into alinement with the second channel overlying and bearing against the unreinforced edge of the strip, which, in the initial feeding, overlies the second channel. This feeding and guiding of the section or strip is then continued by mechanical or power operation of the rolls to complete the hose formaton.

In this feeding of the strip, it will be apparent that the successive lengths of material between successive channels are necessarily in helical formation and that the first convolution is placed and determined as to diameter by hand feeding. This is an important step in the method for it permits the operator to determine and see the diameter of the complete hose at any desired measurement by approximately forming the initial hand-formed convolution of that desired diameter. The positioning of the reinforced edge of the prefabricated strip in the successive channels and the frictional feed of such through cooperation of the rolls insures that the feeding speed of the strip through each channel will be the same. Thus the diameter of the hose will be that of the hand formed initial convolution since the various portions of the tape and hose are moving at the same speed.

Prior to, or while feeding the strip to the initial channel of roll 21, the surfaces of the engaging layers of the joint or seam are coated with a quick-drying adhesive or cement, preferably a rubber, plastic or other appropriate material, and as the reinforced or wire containing edge of the strip is fed through the channel and as in this position it overlies the free edge of the section guided by its reinforced edge through the channel the reinforced edge of the section or strip will, by the rolls, be forced into intimate relation to the overlying free edge of the strip and, by the cementitious material, securely united thereto. Thus it will be apparent that adjacent convolutions are united at their edges in the channels and that the form and diameter of the hose is maintained. The formation thus described is continued until the completely formed unit is of a desired length.

In the making of hose of the type illustrated in Fig. 4, it is the intent that the strip with back-turned edges be fed into the machine in the same manner as has been described with reference to the strip forming the hose of Fig. 1, and that at the same time, apparatus shall be used to interengage the folds at the time the wire band is fed into the seam.

In the making of hose embodying the structure illustrated in Fig. 6, the prefabricated strip formed with the reverse fold along its longitudinal center, incorporating therein the continuous band of wire, is fed between the rolls in a manner whereby the wire enclosed portion is caused to be guided into the channels of the roll 21, thus to maintain the spacing of the successive spirals and to cause the free edge portions of the strip to be overlapped and pressed together; it being understood that either prior to or during the rolling operation, suitable cementitious material is applied along the seams so that the pressure will cause the uniting of these edges. Additional cementitious or coating material such as rubber or plastic, may be spread on one or both sides of the strip or fed between the rollers in such a manner as to coat inside or outside of the hose or both with any desired thickness of coating. After the hose has left the rollers, it might be sprayed or otherwise finished for purpose of appearance or to add durability and protection.

Having thus described my invention, what I claim as new therein and desire to secure by Letters Patent is:

1. A flexible tube of the character described, comprising a continuous, ribbon-like strip of flexible material, formed into a succession of spirals of equal diameter, with edge portions of each spiral overlapped and cementitiously united with those next adjacent thereto in a continuous seam, and a resilient reinforcing band incorporated in the seam and coextensive therewith, said flexible material between reinforcing bands being inwardly troughed to increase the flexibility of the completed tube.

2. A flexible tube of the character described comprising a continuous strip of flexible material formed with a coextensive, longitudinal fold and having a resilient reinforcing band enclosed in the fold throughout the length of the strip; said strip being formed into a succession of spirals with edges overlapped and cementitiously united, said flexible material between reinforcing bands being inwardly troughed to increase the flexibility of the completed tube.

3. A tube as recited in claim 2 wherein the reinforcing band is enclosed within the strip adjacent one longitudinal edge thereof, and wherein the reinforced edge of the strip underlies the unreinforced opposite edge of the strip in the formation and uniting of the spirals.

4. A tube as recited in claim 2 wherein the strip of flexible material is folded upon itself along a central longitudinal line to provide a strip of double thickness, and wherein the resilient reinforcing band is seated within the longitudinal fold of the strip and is co-extensive therewith.

5. A tube as recited in claim 2 wherein the strip of flexible material is folded upon itself along a central longitudinal line, and a fold is provided substantially intermediate the edges of the strip, and wherein the resilient reinforcing band is seated within the longitudinal fold of the strip and is co-extensive therewith.

RICHARD G. BRINGOLF.

REFERENCES CITED

The following references are of record in the file of this patent:

UNITED STATES PATENTS

| Number | Name | Date |
|---|---|---|
| 164,946 | Stone | June 29, 1875 |
| 470,738 | Bayles | Mar. 15, 1892 |
| 746,630 | Greenfield | Dec. 8, 1903 |
| 1,594,612 | Gillies | Aug. 3, 1926 |
| 1,974,285 | Maclachlan | Sept. 18, 1934 |
| 2,106,018 | Raiche | Jan. 18, 1938 |
| 2,176,762 | Forbes | Oct. 17, 1939 |
| 2,337,373 | Chernack | Dec. 21, 1943 |
| 2,337,374 | Chernack | Dec. 21, 1943 |
| 2,340,794 | Chernack | Feb. 1, 1944 |
| 2,366,087 | Chernack | Dec. 26, 1944 |